(12) United States Patent
Ramon (10) Patent No.: US 10,873,617 B2
(45) Date of Patent: Dec. 22, 2020

(54) METHOD AND SYSTEM FOR STREAMING DATA OVER A NETWORK

(71) Applicant: BARCO N.V., Kortrijk (BE)

(72) Inventor: Peter Gerard Paula Ramon, Assebroek (BE)

(73) Assignee: BARCO N.V., Kortrijk (BE)

( * ) Notice: Subject to any disclaimer, the term of this patent is extended or adjusted under 35 U.S.C. 154(b) by 0 days.

(21) Appl. No.: 16/634,663

(22) PCT Filed: Jun. 18, 2018

(86) PCT No.: PCT/EP2018/066149
§ 371 (c)(1),
(2) Date: Jan. 28, 2020

(87) PCT Pub. No.: WO2019/020279
PCT Pub. Date: Jan. 31, 2019

(65) Prior Publication Data
US 2020/0274915 A1  Aug. 27, 2020

(30) Foreign Application Priority Data

Jul. 28, 2017 (EP) ..................................... 17183896
Aug. 25, 2017 (EP) ..................................... 17188000

(51) Int. Cl.
| | | |
|---|---|---|
| *G06F 15/16* | (2006.01) | |
| *H04L 29/08* | (2006.01) | |
| *H04L 29/06* | (2006.01) | |
| *H04L 12/24* | (2006.01) | |

(52) U.S. Cl.
CPC .............. *H04L 67/02* (2013.01); *H04L 41/12* (2013.01); *H04L 41/5054* (2013.01); *H04L 63/0823* (2013.01); *H04L 67/16* (2013.01); *H04L 69/329* (2013.01)

(58) Field of Classification Search
CPC ......... H04L 67/02; H04L 41/12; H04L 67/16; H04L 69/329; H04L 41/5054; H04L 63/0823
See application file for complete search history.

(56) References Cited

U.S. PATENT DOCUMENTS

| | | | |
|---|---|---|---|
| 8,528,085 B1* | 9/2013 | Juels ....................... | G06F 16/13 726/22 |
| 9,860,569 B1* | 1/2018 | Wilms .................... | G11B 27/10 |
| 2009/0259736 A1 | 10/2009 | Chang et al. | |

(Continued)

FOREIGN PATENT DOCUMENTS

| | | |
|---|---|---|
| WO | 2008133555 A1 | 11/2008 |
| WO | 2013028578 A1 | 2/2013 |

OTHER PUBLICATIONS

International Search Report and Written Opinion in corresponding PCT/EP2018/066149, dated Oct. 19, 2018.

(Continued)

*Primary Examiner* — Thanh T Nguyen
(74) *Attorney, Agent, or Firm* — Bacon & Thomas, PLLC (57) ABSTRACT

A method and system for configuring network devices for streaming electronic media data over a computer network. The network includes type 1- and type 2 network devices and the data can be streamed from a type 1 network device to a type 2 network device according to an electronic value. A use-case includes a collection of such electronic values.

19 Claims, 5 Drawing Sheets

(56) References Cited

U.S. PATENT DOCUMENTS

2014/0300739 A1* 10/2014 Mimar .................. G08B 21/06
348/148
2015/0379020 A1* 12/2015 Steiner ................. G06F 16/113
707/668

OTHER PUBLICATIONS

International Preliminary Report on Patentability in corresponding PCT/EP2018/066149, dated Nov. 21, 2019.
Second Written Opinion in corresponding PCT/EP2018/066149, dated Jul. 3, 2019.

* cited by examiner

METHOD AND SYSTEM FOR STREAMING DATA OVER A NETWORK

The present invention relates to a system and method for collaboration distributed over different locations. One location may have a moderator moderating the collaboration session with participants in the one location and other participants in remote locations.

BACKGROUND

Setting up a network for collaboration within or across multiple physical locations can be a tedious task. Conventional methods comprise customized connections between devices enabling a certain use case and leave little possibilities for easily adapting to implement other use cases. For each new use case to be served, equipment needs to be reconfigured and possibly reprogrammed with settings appropriate for the specific use case so that the right data flow is established. Whenever the data flow is to be changed in order to serve a different use case, devices in the network have to be reconfigured and possibly reprogrammed again. Moreover the necessary changes usually require an intervention by a technically qualified person and might require visiting the different locations in order to apply the changes. Adding new use cases that have not been served before usually cannot be done without manual reconfiguration or programming. While in theory the devices in the network might serve significantly different use cases, in practice the reasons mentioned above result in using the equipment mostly for serving a single use case for a longer period of time as quickly switching between use cases by the end user or quickly adding new use cases are practically not feasible.

SUMMARY OF THE INVENTION

It is an object of the present invention to a system and method for collaboration distributed over different locations, one location may have a moderator moderating the collaboration session with participants in the one location and other participants in one or more remote locations.

Embodiments of the present invention provide a method for configuring network devices for streaming electronic media data over a computer network that can comprise a web server, a non-volatile memory and at least two type 1 network devices and at least one type 2 network device connected to the web server over the computer network. The method can comprise the steps of:
the web server creating or receiving an electronic list of all network devices connected to said web server, and each network device can have an entry in the electronic list which entry can be stored by the web server in said electronic list in the non-volatile memory.

Configuring use-cases can comprise:
for at least two use-cases, for each use-case
adding an electronic use-case label to entries of at least two type 1 network devices and at least one type 2 network device in the electronic list,
and for each network device having the electronic use-case label, the web server can store in the non-volatile memory for each network device of a first type, a first list of electronic device labels, and for each network device of a second type, the web server can store a second list of electronic device labels, defining at least one condition wherein for each condition at least one out of a subset of the second list of electronic device labels is present or is not present in the first list of electronic device labels.

Optionally or alternatively, the web server can store a Boolean logic expression comprising at least one Boolean operator out of "AND", "OR", "NOT", and at least one Boolean operand, where for each Boolean operand there is a dedicated item in said second list of electronic device labels.

The step of activating a use-case can comprise:
the web server receiving a notification of a use-case selected by a user via inputs from a web page served by said web server,
and for each network device having the selected electronic use-case label, automatically providing the web server with write access to the non-volatile memory.

For each pair of a type 1 network device and a type 2 network device,
the web server can read the first and second lists of electronic device labels the at least one condition if all conditions defined for the active use-case are fulfilled the web server can instruct the network devices for streaming electronic media data from the type 1 network device to the type 2 network device.

Optionally or alternatively, the web server can read the Boolean logic expression, and for each operand of the Boolean logic expression, if the dedicated item in the second list of electronic device labels is present in the first list of electronic device labels, the web server can set the operand to TRUE (i.e. one of the values of a pair e.g. alternatively FALSE), otherwise it can set the operand to a Boolean value such as FALSE (or alternatively TRUE, i.e. the other value of a pair).

The web server can then optionally or alternatively evaluate the Boolean logic expression and if it yields a Boolean value such as TRUE (i.e. one of the values of a pair or e.g. alternatively FALSE, i.e. the other value of a pair), it can instruct the network devices for streaming electronic media data from the type 1 network device to the type 2 network device.

Additionally or alternatively, the method can comprise, for a selected use-case, while streaming electronic media data over the computer network, adding a network device to the network.

For the added network device the web server can add an entry in the electronic list of network devices, and the web server can add an electronic use-case label to said entry.

If the added network device is of the first type,
then the web server can store, in the non-volatile memory, a first list of electronic device labels.

If the added network device is of the second type,
then the web server can store, in the non-volatile memory, a second list of electronic device labels defining at least one condition wherein for each condition at least one out of a subset of the second list of electronic device labels is present or is not present in the first list of electronic device labels.

Optionally or alternatively, the web server can store a Boolean logic expression. The Boolean expression can comprise at least one Boolean operator out of "AND", "OR", "NOT", and at least one Boolean operand, where for each Boolean operand there is a dedicated item in said second list of electronic device labels.

Then for the added network device having the selected electronic use-case label, the method comprises automatically providing the web server with write access to the non-volatile memory,
and for each pair of the added network device and a network device of a device type other than the added network device, having the use-case label of the selected use-case, the web server can read the first and second lists of electronic device labels and the at least one condition if all conditions defined for the active use-case are fulfilled, and the web server can instruct the network devices for streaming electronic media data from the type 1 network device to the type 2 network device.

Optionally or alternatively, the web server can read the Boolean logic expression and for each operand of the Boolean logic expression, if the dedicated item in the second list of electronic device labels is present in the first list of electronic device labels, the web server sets the operand to TRUE (i.e. one value of a pair), otherwise it sets the operand to FALSE (i.e. the other value of the pair).

Then the web server can optionally or alternatively evaluate the Boolean logic expression and if the Boolean logic expression yields TRUE, (alternatively FALSE i.e. the other value of a pair) the web server can instruct the network devices for streaming electronic media data from the type 1 network device to the type 2 network device.

Additionally or alternatively, the set of electronic device labels of the network device can depend on the credentials or certificates used for connecting the network device to the web server.

Additionally or alternatively, the method can comprise instructing at least one type 2 network device that is receiving at least one electronic media data stream to start rendering the at least one electronic media data stream.

Additionally or alternatively, the method can comprise instructing at least one type 2 network device that is receiving at least one electronic media data stream, to not render at least one of the at least one received electronic media data stream.

Additionally or alternatively, the method can comprise instructing at least one type 2 network device that is receiving at least one electronic media data stream to start rendering the at least one electronic media data stream in accordance with a set of rules. Rendering the content can be done in accordance with a set of rules, e.g. in case of video content the rule can be to respect the aspect ratio of the content and/or arrange the content in a non-overlapping layout, e.g. in case of audio content the rule can be mix the audio signals so that the volume of the audio signals is equal, etc.

Additionally or alternatively, content rendered by each of the type 2 devices having the selected electronic use-case label is preferably received directly from the type 1 device that renders the electronic media data containing said content without any intermediate type 1 or type 2 network device processing said content. For all content that is rendered by the sinks, there is preferably no intermediate type 1 and/or type 2 network devices in between the source that generates the content and the sink that renders the content. In other words, putting things like a network compositor (=a sink that receives several streams, makes a composition and a source that streams out this composition) or a transcoder between the source and the sink is preferably not allowed.

Additionally or alternatively, the step of activating a use-case can comprise the notification having a use-case selected by a user and at least one device label,
and executing the step of activating the selected use-case for all network devices having the use-case label and at least one of the at least one device label.

Additionally or alternatively, the method can comprise while a first use-case is active, the web server receiving a notification comprising a second use-case selected by a user and at least one second device label being different from any of the at least one device label of the first use-case,
and executing the step of activating the selected second use-case for all network devices having the second use-case label and at least one of the at least one second device label.

Additionally or alternatively, the step of activating a use-case can comprise the notification having at least one first device label and at least one second device label and at least one third device label,
and executing the step of activating the selected use-case can comprise adding the at least one third device label to the device label list of all network devices having the use-case label and at least one of the at least one first device label and at least one of the at least one second device label.

In another embodiment of the present invention there is provided a system for exchanging electronic media data over a computer network that can comprise:
a web server, a non-volatile memory and at least two type 1 network devices and at least one type 2 network device connected to the web server over the computer network,
an electronic list of all network devices connected to said web server. Each network device can have an entry in the electronic list, the web server being configured to store the entry in said list in the non-volatile memory.

Then for at least two use-cases, for each use-case the entries of at least two type 1 network device and at least one type 2 network device in the electronic list can have an electronic use-case label.

For each network device having the electronic use-case label,
the non-volatile memory can store:
for each network device of a first type, a first list of electronic device labels,
and for each network device of a second type, a second list of electronic device labels, defining at least one condition wherein for each condition at least one out of a subset of the second list of electronic device labels is present or is not present in the first list of electronic device labels.

Also a Boolean logic expression comprising at least one Boolean operator out of "AND", "OR", "NOT", and at least one Boolean operand can be stored and wherein for each Boolean operand there is a dedicated item in said second list of electronic device labels.

Additionally or alternatively, the system can comprise the web server being configured to be deployed in the cloud or on-premises.

Additionally or alternatively, the system can comprise means for activating a use-case which comprises the web server being configured to receive a notification of a use-case selected by a user via inputs from a web page served by said web server.

For each network device having the selected electronic use-case label, the web server can be configured to automatically receive write access to the non-volatile memory.

And for each pair of a type 1 network device and a type 2 network device, the web server can be configured to read the first and second lists of electronic device labels and the at least one condition if all conditions defined for the active use-case are fulfilled, whereby the web server is configured to instruct the network devices for streaming electronic media data from the type 1 network device to the type 2 network device.

The web server can optionally or alternatively read the Boolean logic expression and for each operand of the Boolean logic expression, if the dedicated item in the second list of electronic device labels is present in the first list of electronic device labels, the web server can be configured to set the operand to TRUE (a value of a pair such as alternatively FALSE), otherwise it sets the operand to FALSE (i.e. the other value of the pair alternatively TRUE).

The web server can be configured optionally or alternatively to evaluate the Boolean logic expression and if the Boolean logic expression yields TRUE (i.e. the one value of the pair alternatively it can be FALSE) the web server is configured to instruct the network devices for streaming electronic media data from the type 1 network device to the type 2 network device.

Additionally or alternatively, the system can comprise, for a selected use-case, while streaming electronic media data over the computer network, means for adding a network device to the network,
and for the added network device the web server can be configured to store in the non-volatile memory, a first list of electronic device labels.

If the added network device is of the second type,
the web server can be configured to store in the non-volatile memory, a second list of electronic device labels defining at least one condition wherein for each condition at least one out of a subset of the second list of electronic device labels is present or is not present in the first list of electronic device labels, Optionally or alternatively, a Boolean logic expression can be stored comprising at least one Boolean operator out of "AND", "OR", "NOT", and at least one Boolean operand, and wherein for each Boolean operand where there is a dedicated item in said second list of electronic device labels, for the added network device having the selected electronic use-case label, the web server can be configured to automatically obtain write access to the non-volatile memory.

For each pair of the added network devices and a network device of a device type other than the added network device, having the use-case label of the selected use-case,
the web server can be configured to read the first and second lists of electronic device labels and the at least one condition—if all conditions defined for the active use-case are fulfilled, the web server can be configured to instruct the network devices for streaming electronic media data from the type 1 network device to the type 2 network device.

Alternatively or optionally, the web server can be configured to read the Boolean logic expression and for each operand of the Boolean logic expression, if the dedicated item in the second list of electronic device labels is present in the first list of electronic device labels, the web server can be configured to set the operand to a Boolean value such as TRUE, otherwise it sets the operand to FALSE (or vice versa).

The web server can be optionally or alternatively configured to evaluate the Boolean logic expression and if the Boolean logic expression yields a Boolean value such as TRUE (or alternatively FALSE) the web server can be configured to instruct the network devices for streaming electronic media data from the type 1 network device to the type 2 network device.

Additionally or alternatively, the system can comprise that the set of electronic device labels of the network device can depend on the credentials or certificates used for connecting the network device to the web server.

Additionally or alternatively, the system can comprise that at least one type 2 network device can receive at least one electronic media data stream being configured to receive an instruction to start rendering the at least one electronic media data stream.

Additionally or alternatively, the system can be configured so that any content rendered by each of the type 2 devices having the selected electronic use-case label is received directly from the type 1 device that renders the electronic media data containing said content without any intermediate type 1 or type 2 network device processing said content.

For all content that is rendered by the sinks, there is preferably no intermediate type 1 and/or type 2 network devices in between the source that generates the content and the sink that renders the content. Putting things like a network compositor (=a sink that receives several streams, makes a composition and a source that streams out this composition) or a transcoder between the source and the sink is preferably not allowed.

Additionally or alternatively, the system can comprise that at least one type 2 network device that is receiving at least one electronic media data stream, can be configured to receive an instruction to not render at least one of the at least one received electronic media data stream.

Additionally or alternatively, the system can configured so that at least one type 2 network device that is receiving at least one electronic media data stream is instructed to start rendering the at least one electronic media data stream in accordance with a set of rules. The at least one type 2 network device can be configured to rendering the content in accordance with a set of rules, e.g. in case of video content the rule can be to respect the aspect ratio of the content and/or arrange the content in a non-overlapping layout, e.g. in case of audio content the rule can be mix the audio signals so that the volume of the audio signals is equal, etc.

Additionally or alternatively, the system can comprise that the means for activating a use-case can comprise the notification having a use-case selected by a user and at least one device label, and can be configured to execute activating of the selected use-case for all network devices having the use-case label and at least one of the at least one device label.

Additionally or alternatively, the system can comprise that while a first use-case is active, the web server can be configured to receive a notification comprising a second use-case selected by a user and at least one second device label being different from any of the at least one device label of the first use-case.

The web server can also be configured to execute activating of the selected second use-case for all network devices having the second use-case label and at least one of the at least one second device label.

Additionally or alternatively, the system can comprise that the means for activating a use-case can comprise the notification having at least one first device label and at least one second device label and at least one third device label, and can be configured to execute activating of the selected use-case by adding the at least one third device label to the device label list of all network devices having the use-case label, and at least one of the at least one first device label and at least one of the at least one second device label.

In another embodiment of the present invention there is provided a computer program product which when executed on a processing engine can perform a method according to any of the above mentioned methods.

In another embodiment of the present invention there is provided a non-transitory signal storage device storing the computer program product of the above computer program product.

DEFINITIONS

A "network device" relates to a network enabled digital processing device having some form of output medium such as a display screen (video), speakers (audio), disk (recorder), etc. or input medium such as a camera (video), a microphone (audio), a mouse (mouse events), disk (player), etc. These output and or input media can be built-in into the device or be external and connected to the device. Alternatively, a network device might receive data from the network and send it out after doing some form of processing on it, on the same or a different network. This is typically the case for transcoders that convert one media stream into another. A network device has a processing engine, i.e. digital processor such as an FPGA (or a microprocessor, having e.g. a Central Processing Unit (CPU) and/or a Graphical Processing Unit (GPU) and memory as well as interfaces such as a serial port or a network interface. A network device in operation is connected to a network, can access this network and use the facilities of the network as well as having local capabilities, applications, functions etc. Note that a BYOD can be a network device, however not all network devices can be considered to be BYODs.

A "non-volatile memory" is a type of memory that retains its information also after that the power has been removed.

"Electronic media data" can be (digital) data, ones and zeros, representing electronic media content, such as for example images, video streams, audio streams, html code, etc.

A "source" can be any device in the network that can render a stream of data, e.g. a video stream, audio stream, a combined video-audio stream, a stream of keyboard events, an html page, . . . .

In the text, a source can be referred to as a "type 1 network device". A source can have a "source role" that qualifies the function of the source in a use case. A source role For example a camera source can have a source role "document camera" denoting that the function of this source in the use case is to film paper documents so that the resulting video can be distributed to one or more destinations. A source role can be stored as an "electronic device label".

Apart from a source role, a source may have one or more static labels and/or session specific labels. Static labels e.g. allow grouping sources together, for example all sources that are physically located in "room A" can have a static label "room A". Session specific labels are assigned whenever a use case in which the source is participating starts. For example if a use case "Overflow lecture" is started and "room A" is denoted as being the master room from which the presenter will do a presentation, all sources that are physically located in "room A" can receive a session specific label "master room" associated with them.

A "sink" or destination can be a network device in the network that can receive at least one stream from a source in the network and render the received stream(s) into a form suitable for an end-user (e.g. show video on a display, output audio through speakers, visualize a stream of mouse events using a cursor on a display, . . . ). Alternatively or additionally it can store or forward the received content, potentially after processing it. In the text, a sink can be referred to as a "type 2 network device".

A "sink role" indicates the function of the sink in a use case. For example a display sink can have a sink role "confidence monitor of master screen" denoting that it will show a copy of the content that is rendered by a display sink that has sink role "master screen".

In a similar way as for a source, a sink may have one or more static labels and/or session specific labels. Static and/or session specific labels serve the same purpose as explained above for sources.

A sink role can be stored as an "electronic device label".

Also, a "static label" or a "session specific label" can each be stored as an "electronic device label".

A "filter" can be a computer program that selects certain items out of a given set of items. Only items fulfilling certain criteria are retained in the resulting set of items. Criteria usually comprise but are not limited to source and sink roles, static labels, session specific labels and credentials associated with the sources and sinks.

A filter can be represented by a Boolean expression together with an electronic device label list.

The Boolean expression can comprise Boolean operators AND, OR or NOT can be interpreted according to the following
false AND false←result=false
false AND true←result=false
true AND false←result=false
true AND true←result=true
false OR false←result=false
false OR true←result=true
true OR false←result=true
true OR true←result=true
NOT false←result=true
NOT true←result=false A Boolean operand can be TRUE or FALSE.

A "rule" can be a function that governs the data rendering. A rule is always associated to a sink role and can comprise a filter but is more general than a filter, it also comprises a "rendering part". For example, a rendering part can instruct the sink to which the rule applies on how to render the set of items resulting after applying a filter. For example in case of a display sink the rendering part can instruct what type of layout to be used when rendering multiple streams. A rendering part might also instruct a selected source on for example the data format or encoding scheme to be used for streaming.

A "use-case" can be a collection of possible scenarios or sequences of interactions between elements in a network related to a particular goal. As a minimum, a use case comprises a set of source roles and sink roles and rules associated to the sink roles. A use case can be activated on all sources and sinks in the network or on a selected set of sources and sinks in the network (e.g. all sources and sinks that have a certain static label). Note that multiple use cases can be active simultaneously in a network on distinct sets of sources and sinks. In software and systems engineering, a use case is a list of actions or event steps typically defining the interactions between a role known in the Unified Modeling Language as an actor and a system to achieve a goal. The actor can be an external system. The detailed requirements may be captured in the Systems Modeling Language (SysML) or as contractual statements.

A "BYOD" (Bring Your Own Device) is any computation device for personal use and can comprise laptops, mobile phones, smartphones, tablets, palm pads and the like, hence it is a processing device. In the present context it can also include a stationary computer. A BYOD can have multiple sinks such as a display, speakers, a disk as well as multiple sources such as a camera, a microphone, a disk. The sinks can be built-in into the BYOD or be external and connected to the device.

A "network" can be a Local Area Network (LAN), e.g. a company network, or a Virtual Private Network within a LAN or any network that has a limited extent and a defined number of users who can access it. It will typically have shared resources.

It can also be a "global network" for example the public internet that extends across the globe and is accessible for anyone. It can also be a private leased line on a network that can span over large distances.

A "web server" can be machine or component, comprising software, that can provide access to information accessible from a computer connected to the Internet or an intranet. It can for example receive web page requests and return web pages in response to the requests.

"The cloud" is a metaphor for the Internet. Cloud computing is usually Internet-based computing. It is a style of computing in which IT-related capabilities are provided "as a service", allowing users to access technology-enabled services from the Internet ("in the cloud") without knowledge of, or control over the technologies behind these servers.

A "service application" can be a function provided by a server. The service application can be deployed as a local service ("on-premise") or as a "cloud service", or it can be distributed among the network devices, or any combination thereof.

A "cloud service" can be any service provided to users on demand via the internet from a cloud computing provider's servers.

A "back end" can be a process or combination of processes that can run on web server hardware, e.g. in the cloud such as in a data center, that serve html pages, execute business logic including acting upon requests from the browsers and handles database storage. The back end usually consists of three parts: a server, an application (e.g. the service application mentioned above), and a database.

A "user credential" can be any user identification data, e.g. a user name together with a matching password or a certificate, used to connect to a service application. Sources and sinks registered to the service application by a client or an agent, can be associated with the user credentials used by the client or agent to connect to the service application.

DETAILED DESCRIPTION OF THE INVENTION

The present invention will be described with respect to particular embodiments and with reference to certain drawings but the invention is not limited thereto but only by the claims. The drawings described are only schematic and are non-limiting.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B. Similarly, it is to be noticed that the term "coupled", also used in the description or claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

References to software can encompass any type of programs in any language executable directly or indirectly by a processor. References to logic, hardware, processor or circuitry can encompass any kind of logic or analog circuitry, integrated to any degree, and not limited to general purpose processors, digital signal processors, ASICs, FPGAs, discrete components or transistor logic gates and so on.

Figure 1:
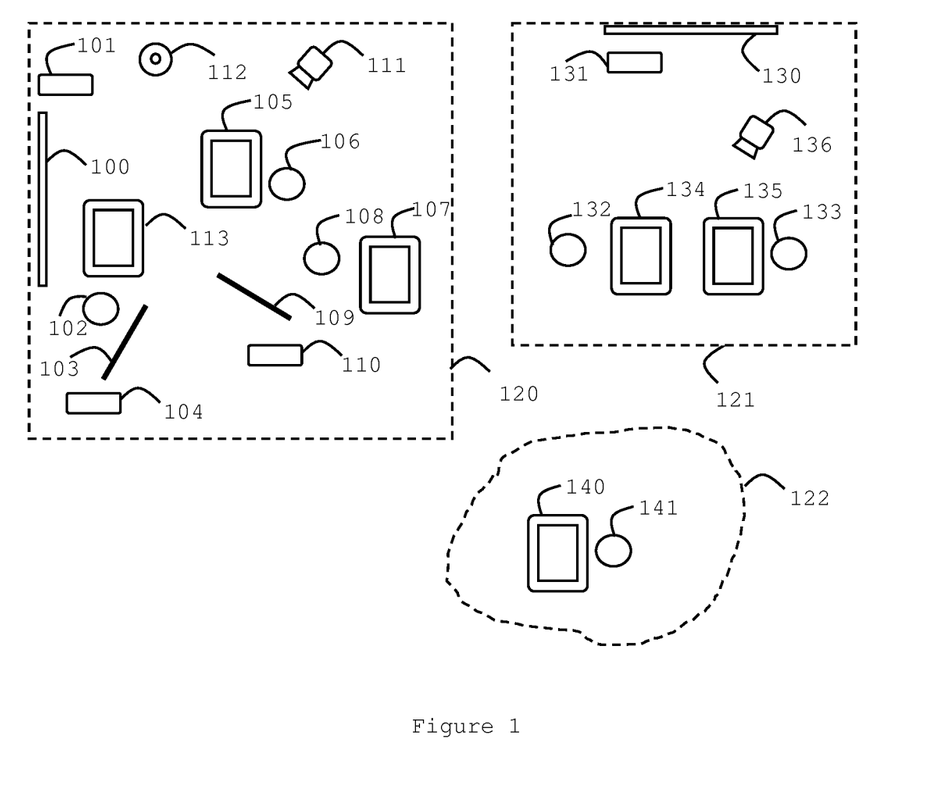
FIG. 1 shows an embodiment of the present invention comprising BYOD's and network devices distributed over several physical locations.

FIG. 1 shows an embodiment of the present invention comprising a system for collaboration being distributed over different locations. There can be a main location 120, an overflow location 121 within the same campus as 120, and a remote site 122. In the main location 120 there is a moderator 102 moderating the collaboration session use case using a BYOD 113, a main screen 100, driven by network device 101, a self-view screen 103 driven by a network device 104. A self-view screen can be used to show the moderator what the participants in the remote locations see. In the main room 120 there are also two participants 106 and 108. Participant 106 operates a BYOD 105 and participant 108 operates a BYOD 107. There is also a far-view display 109 driven by a network device 110. A far-view display can be used if the location is very big and the participants are located far from the main screen. The location 120 is also equipped with a camera 111 and a microphone 112.

Location 121 can for example be an "overflow room" that can be used to house further participants when the main location 120 would be fully occupied. The room 121 can have a main screen 130, driven by a network device 131. In this example the room 121 has two participants 132 and 133, who are operating BYOD's 134 and 135 respectively. The room is also equipped with a camera 136.

Locations 120 and 121 can be located within the same campus (for example a university campus), and location 122 can be located outside this campus (for example the home of a student). The user 141 in the off-site location 122 can participate via the BYOD 140.

All devices in the collaboration system can report to a web server that can be on premise or in the cloud. The collaboration system can be managed by a service application, or web application, located on the server or distributed among the network devices.

Figure 2:
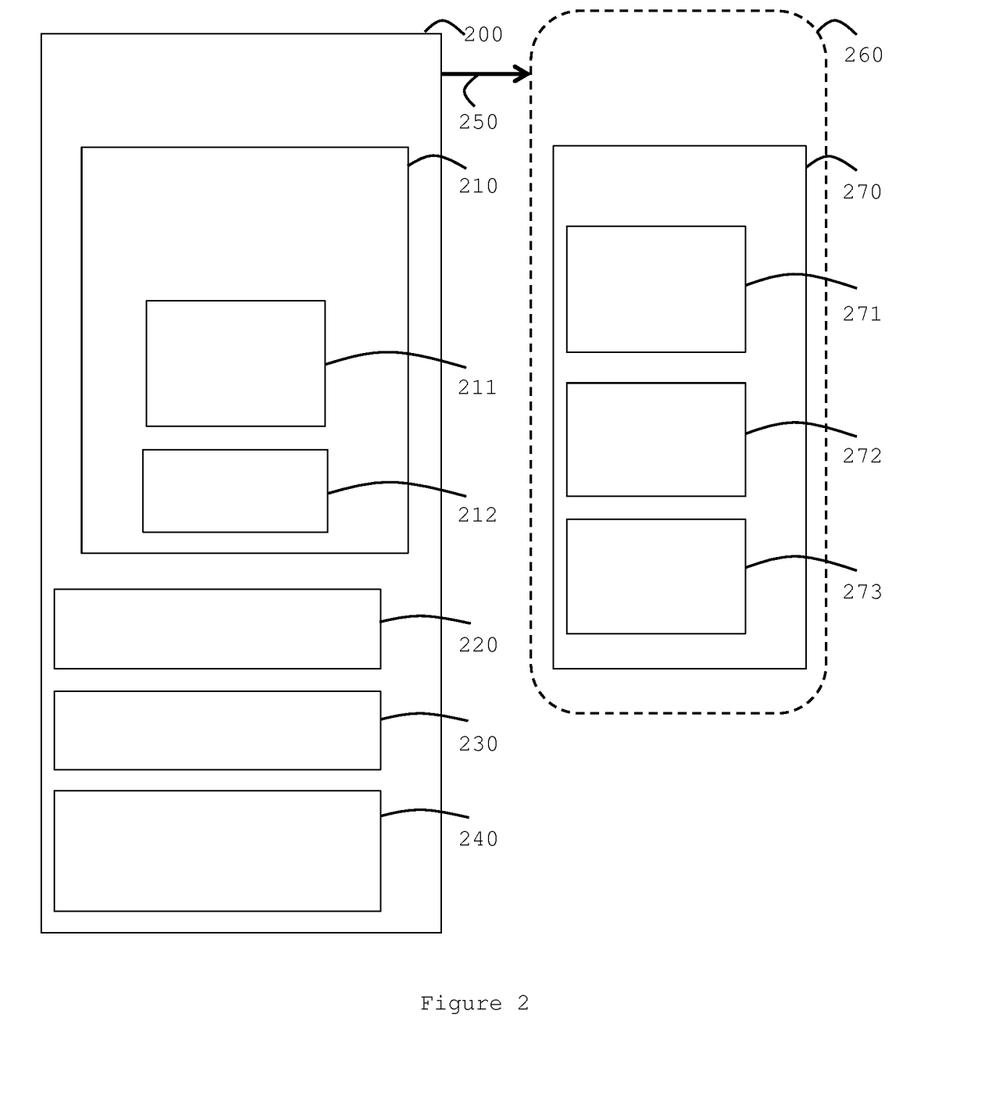
FIG. 2 shows the relationships and multiplicity of the elements used by a use case as used in the present invention.

FIG. 2 shows an embodiment of the present invention comprising the items involved in a use case definition and its application onto a set of sources and sinks. Each use case definition 200 (of [2 . . . n] use case definitions) involves at least one source role definition 230 (of [1 . . . n] source role definitions) and at least one sink role definition 220 (of [1 . . . n] sink role definitions). Such role definition denotes the function of the source or sink as part of the use case. For each sink role definition 220 a corresponding rule 210 needs to be defined. There can be [1 . . . n] rules. A rule consist of a filter 211 and an optional rendering part 212. The filter 211 is mandatory and serves for selecting the data streams to be rendered by the sink. There is exactly one filter (which can be made up out of a combination of sub-filters). So out of the set of sources to which the filter is applied, the sources retained by the filter 211 are to be rendered by the sink with sink role corresponding to the rule that comprises the filter. Next to the filter a rule can also contain a rendering part 212 (of [0 . . . 1] rendering parts). The rendering part 212 can give info to the sink on how the data streams selected by the filter 211 are to be rendered by the sink with sink role corresponding to the rule that comprises the rendering part. It can also be used to give info to a selected source on how it should render the data stream. So there are as many rules 210 as there are sink roles definitions 220. There can be of [1 . . . n] sink role definitions. Note that some of the defined sink roles 220 and the corresponding rules 210 might be re-usable over multiple use cases. Optionally a use case can also comprise session specific label definitions 240. There can be [0 . . . n] session specific label definitions. These session specific label definitions 240 allow influencing the behaviour of a use case when it is launched. Whenever a use case has been activated on a set of sources and sinks 260, the sources and sinks 270 each have exactly one role 271 that has been assigned at the moment the use case was activated. As mentioned, in the case of a sink, the assigned sink role has a corresponding rule. Sources and sinks 270 also can have optional static labels 272 assigned to them. There can be [0 . . . n] static labels. These static labels 272 do not change when the use case changes. The can be used for example to group sources and/or sinks together. For example all sources and sinks that are physically located in a room called "Room A" can have a static label "Room A". Optionally there can also be [0 . . . n] session specific labels 273, as defined by the session specific label definition 240 of the use case definition 200 of the applied use case. The session specific labels 273 exist only during the lifetime of the applied use case session. They allow to set certain parameters, for example in an overflow lecture use case session, out of all rooms that participate in the session it must be clear which room will serve as main room from which the presenter will present. So this information can be passed along when the use case session is started. In the mentioned example the session specific labels 273 can make clear which sources and sinks 270 belong to the main room of the overflow lecture use case. When applying a different use case on the same selection of sources and sinks, the corresponding roles 271 and session specific labels 273 will be applied on sources and sinks 270, replacing the ones from the previous use case session.

Figure 3:
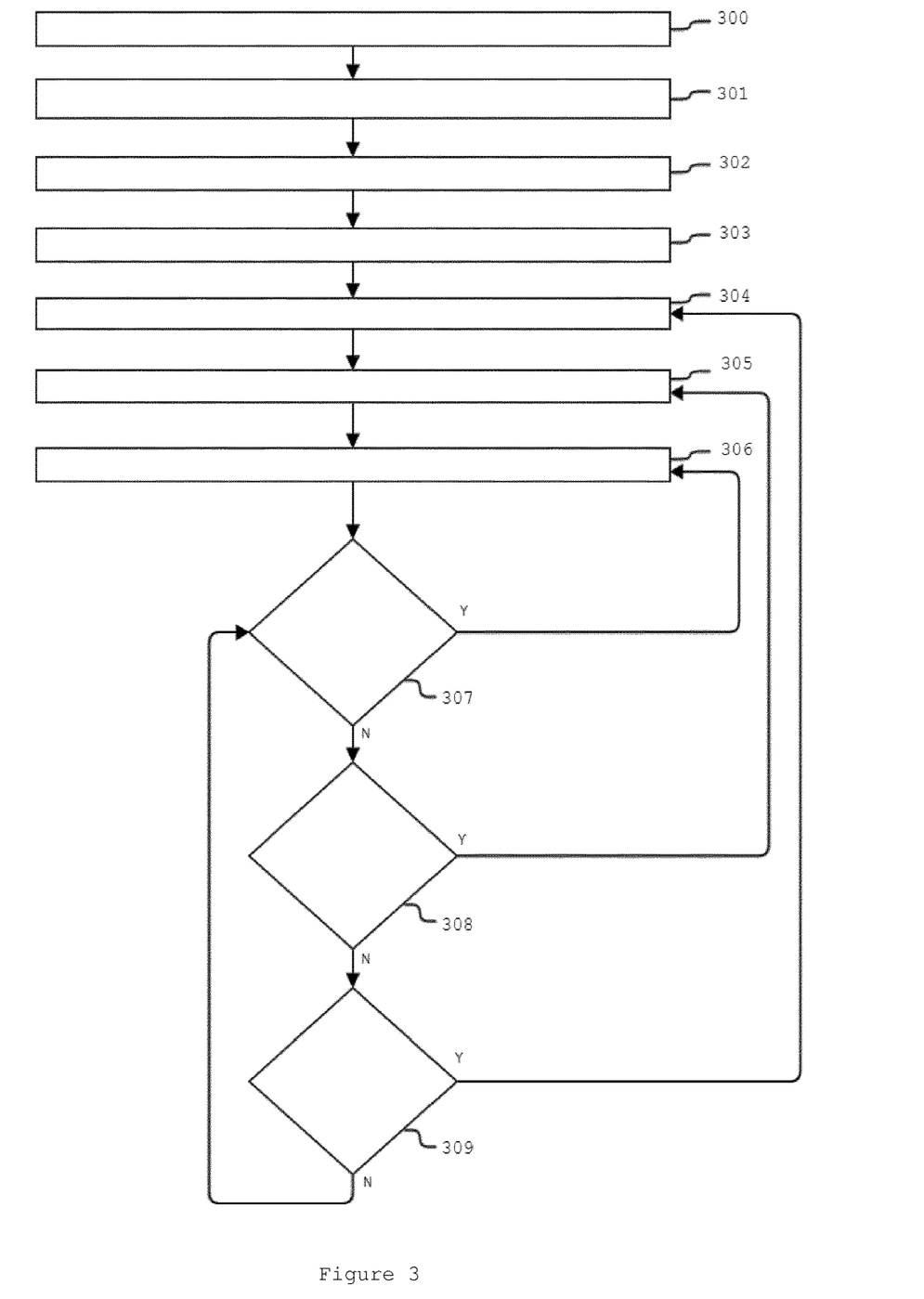
FIG. 3 shows a flow chart of an embodiment of the present invention.

FIG. 3 shows a flow chart of an embodiment of the present invention. Step 300 comprises defining all the use cases to be supported and in step 301 all sources and sinks that can participate in the use cases are identified and static labels can be associated to them if required.

The sources can be e.g. video or audio sources, but input devices such as keyboards can also be considered sources. The sources can deliver content as a stream (e.g. video stream, audio stream, stream of keyboard events, . . . ) or in a descriptive way (e.g. an html page).

The sinks, or destinations, can receive content and "render" it in a suitable way for a user to receive. E.g. a video stream can be shown on a display, or an audio stream can be outputted through loudspeakers, a stream of mouse events can be visualized using a cursor on a display, etc. A sink can also store or forward the received content—potentially after processing it.

Usually the rules of a use case can be active on a selected set of sources and sinks (for example all sources and sinks having a specific static label or session specific label or combination thereof—to be specified when the use case starts) and the sources and sinks that can be dynamically added to the use case while it is active (typically these can be sources and sinks of the BYODs connecting to participate in the use case).

In a next step 302, all source roles and sink roles and session specific labels that can be used in the use cases to be supported need to be defined, including the source roles and sink roles and session specific labels to be used for sources and sinks that are dynamically added while a use case is active. For example a camera source could have a source role "presenter camera" meaning that this camera will be filming the presenter. A display sink could have a sink role "confidence monitor main screen" meaning that this display will show a copy of the content shown on the main screen. For each sink role, an associated rule needs to be defined. This comprises defining the filter to be used to select the sources to be rendered but can as well comprise defining the rendering part that for example tells the sink how it should render the sources retained by the filter. In the case of video sink the rendering part could for example instruct the sink to render the video sources in a non-overlapping layout.

In step 303 for each use case to be supported, the sink role and session specific labels to be applied to each sink and the source role and session specific labels to be applied to each source are to be defined.

All items defined in the steps described till now can be stored by the service application.

In a next step 304 a use case can be activated. As a consequence, in step 305 all source roles, sink roles and session specific labels as defined for the use case in step 303 will be applied to the appropriate sources and sinks.

Step 306 comprises applying the rules corresponding to each sink role in the use case. This comprises applying the filter of the rule to any source participating in the use case and to instruct the sink to render the content received from the sources that are retained by the filter in a way as defined by the rendering part of the rule. For example, for setting up a parking surveillance room use case, all cameras filming the parking could have a source role "parking camera". All the cameras of a specific parking can be grouped together using a static label, e.g. "Parking A". A rule could then be applied to a display with sink role "parking surveillance monitor Parking A" having the following filter: [has source role "parking camera" and has label "Parking A"]. Applying the filter will retain all sources with source role "parking camera" and label "Parking A". Furthermore the rendering part of the rule could specify to auto-layout the matching sources on the display in a non-overlapping way.

Steps 307 and 308 show what can happen when sources and or sinks are dynamically removed from or added to an active use case. As shown by steps 307 and 306, removing sources and or sinks while a use case is active requires the rules to be re-applied to the remaining sinks in the use case so that the correct content is rendered. Adding new sources and or sinks to an active use case requires one extra step as shown by steps 308 and 305 because first the correct source roles and or sink roles and session specific labels need to be applied to the newly added sources and or sinks as shown in step 155. Dynamically adding or removing sources and or sinks typically happens when the use case comprises the use of BYODs. For example, upon connecting a BYOD to the service application, the camera and microphone of the BYOD can be registered as new sources and the display and the speakers of the BYOD can be registered as new sinks that participate in the use case. As users can connect or disconnect their BYOD at any time while the use case is active, the sources and sinks of the BYOD can be added or removed dynamically.

Step 309 shows what can happen in case a different use case needs to be activated. As shown in the flowchart, in such case we go back to step 304 and apply all source roles and sink roles and rules corresponding to the newly activated use case.

Figure 4:
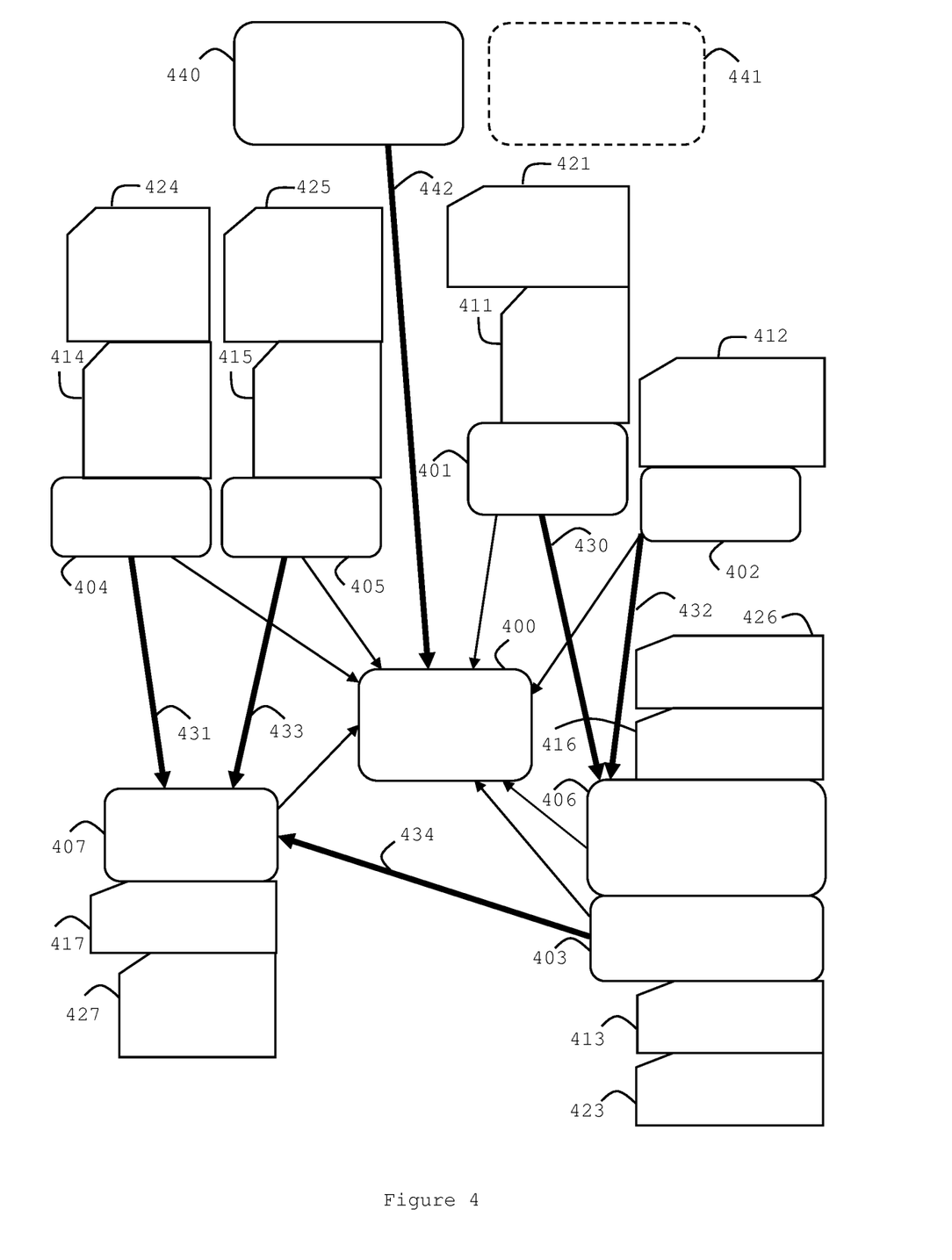
FIG. 4 shows an embodiment of the present invention comprising network devices.

FIG. 4 is an embodiment of the present invention showing an example of a use case "Recorded Active Learning Class" 440. A new instance of use case "Recorded Active Learning Class" that takes place in a classroom called "Classroom A" can be scheduled. This means that the use case is to be applied at the scheduled time on the sources and sinks of the network devices that are physically located in classroom "Classroom A". The as such created lecture can be called "Lecture A". The sources and sinks of classroom "Classroom A" can be easily identified in the network as they all have a static label "Classroom A". When the lecture starts, the for this use case "Recorded Active Learning Class" source- and sink roles as well as the for this use case defined session specific labels, will be applied to all sources and sinks participating in the lecture. In the example, there is only one session specific label which is the name of the lecture "Lecture A" 400. So all sources and sinks that participate in the lecture will receive their for the "Recorded Active Learning Class" use case defined role as well as a session specific label "Lecture A". Whenever a participant of the lecture connects a BYOD to the service application and joins the active lecture, the BYOD sources and sinks that are being registered can also receive session specific label "Lecture A". So the rules associated to the use case "Recorded Active Learning Class" are for this instance "Lecture A" applied to all sources and sinks having the extra attribute "Lecture A". For example there is a camera source 404 in the classroom with static label "Classroom A" 414 to which the source role "presenter camera" 424 is applied as well as the session specific label "Lecture A" 400 upon start of the lecture. A microphone source 405 with static label "Classroom A" 415 receives role "presenter microphone" 425 and session specific label "Lecture A" 400. A document camera source 401 with static label "Classroom A" 411 receives role "document camera" 421 and session specific label "Lecture A" 400. To present digital documents the presenter can use a source "BYOD" 402 that receives the for this use case defined source role "BYOD screen share" 412 and the session specific label "Lecture A" 400. There can be a sink "display" 406 with static label "Classroom A" 416 that receives sink role "master screen" 426 and session specific label "Lecture A" 400. The rule associated to this sink role 426 can have a filter [(source role equals "BYOD screen share" or equals "document camera") and (source has a label "Lecture A")] resulting in sources 401 and 402 streaming their respective content 430 and 432 to sink 406. Furthermore the rendering part of the rule associated to sink role "master screen" can instruct the sink to render the sources retained by the filter in a non-overlapping way. So sink 406 will act as "master screen" and show the content of the document camera 401 and BYOD 402, preferably after moderation by the presenter if the rule instructs so. A source "screen scraper" 403 with static label "Classroom A" 413 receiving source role "content" 423 and the session specific label "Lecture A" 400 can screen-scrape the video shown by sink 406 and stream the respective content 434 to a multi-track audio-video recorder sink 407 with static label "Classroom A" 417 that received sink role "lecture recorder" 427. The filter comprised by the rule associated with the sink role "lecture recorder" also causes the data 431 from camera source 404 with source role "presenter camera" 424 and the data 433 from a microphone source 405 with source role "presenter microphone" 425 to be streamed to the audio-video recorder sink 407. Other use cases such as use case "Huddle Space" 441 can be defined for this classroom and can be activated when an instance of this use case applied to this classroom starts. Note that while a certain use case is active on a selected set of sources and sinks (in this example all sources and sinks that have extra attribute "Lecture A"), other use cases may be active on other selections of sources and sinks.

Note that while a certain use-case is active, sources and sinks can dynamically be added or removed: E.g. a remote student can connect to a lecture and receive content from the lecture. For this to happen, the sources (e.g. camera and microphone) and sinks (e.g. display and speakers) of the BYOD of the student will be registered to the service application and receive source and sink roles respectively and extra attributes. The roles that are assigned to the sources and the sinks can be based upon the credentials used for connecting the device to the service application. Whenever sources or sinks are added or removed, the active rules will be re-applied and the data streams between sources and sinks will be adjusted where needed.

Instead of storing a sink role, the corresponding rule can be stored for the sink. In case the rule has no rendering part, this can be equivalent with storing a list of electronic device labels. Alternatively or optionally a Boolean logic expression for the type 2 network device can be stored.

Figure 5:
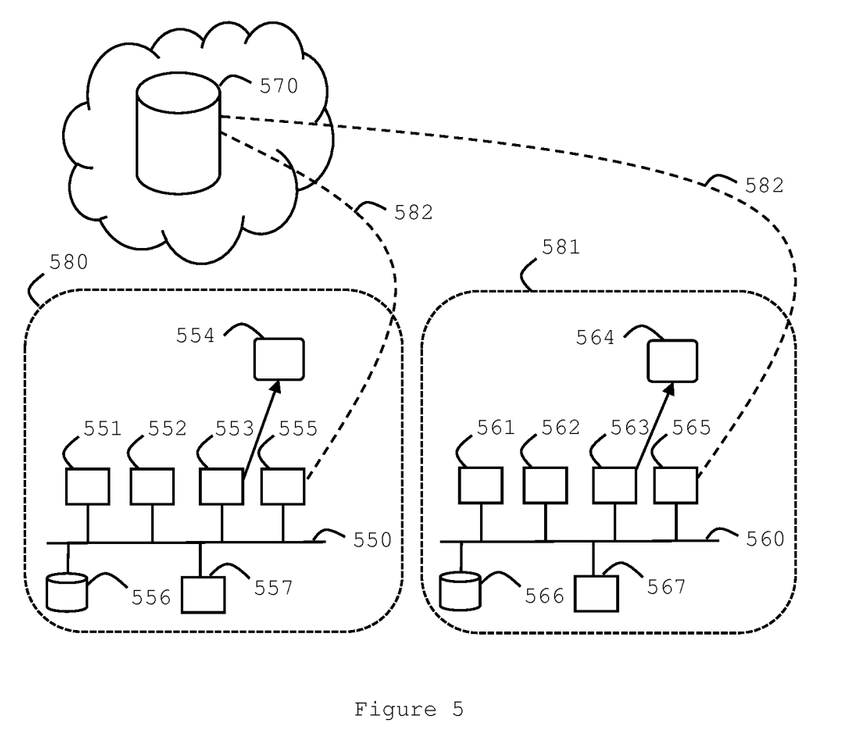
FIG. 5 shows block diagrams of an embodiment of the present invention.

FIG. 5 shows block diagrams of an embodiment of the present invention. There can be at least two network devices 580 and 581 connected over a network 582 with a server 570 in the cloud. The network devices 580/581 can each comprise a processor 551/561 (e.g. a Central Processing Unit, CPU), a work memory 552/562 and a source or sink 554/564 (e.g. a microphone, a loudspeaker, a display, . . . ) driven by a driver for the respective source or sink 553/563 (e.g. display driver, a Graphics Processing Unit, an audio card, etc.). A single network device can have multiple sources and or sinks 554/564, each having a corresponding driver 553/563. There can be a non-volatile memory 556/566 and means for input 557/567 (e.g. keyboard, mouse, touchscreen, touchpad, pen, microphone, gesture sensor, or any combination thereof). The sources and/or sinks can be connected to the network 582 by means of a network adapter or Network Interface Card, NIC 555/565 (e.g. Ethernet, WiFi). The processor 551/561 runs one or more processes that allow connecting the device to the service application and to register the device's sources and sinks. It also runs processes that control the rendering of data streams as instructed by the rules of the use case to which the device participates.

Accordingly, network elements described with respect to embodiments of the present invention such as servers, display devices, back-end devices, rendering devices, streaming devices for example each optionally able to display a web browser optionally associated with a selection menu can be performed by a standalone digital processing device or can be embedded in another device. Such devices or methods can use a digital processing engine to carry out functions. The processing engine preferably has processing capability such as provided by one or more microprocessors, FPGA's, or a central processing unit (CPU) and/or a Graphics Processing Unit (GPU), and is adapted to carry out the respective functions by being programmed with software, i.e. one or more computer programmes. References to software can encompass any type of programs in any language executable directly or indirectly by a processor, either via a compiled or interpretative language such as Java. The implementation of any of the methods of the present invention can be performed by or assisted by logic circuits, electronic hardware, processors or circuitry which can encompass any kind of logic or analog circuitry, integrated to any degree, and not limited to general purpose processors, digital signal processors, ASICs, FPGAs, discrete components or transistor logic gates and similar.

Such devices may have memory (such as non-volatile memory, non-transitory computer readable medium, RAM and/or ROM), an operating system, optionally a display such as a fixed format display, ports for data entry devices such as a keyboard, a pointer device such as a "mouse", serial or parallel ports to communicate other devices, network cards and connections to connect to any of the networks.

The software can be embodied in a computer program product adapted to carry out the functions itemised below when the software is loaded onto the controller and executed on one or more processing engines such as microprocessors, ASIC's, FPGA's etc. devices for use with any of the embodiments of the present invention can incorporate a computer system capable of running one or more computer applications in the form of computer software.

The methods of embodiments of the present invention can be performed by one or more computer application programs running on the computer system by being loaded into a memory and run on or in association with an operating system such as Windows™ supplied by Microsoft Corp, USA, Linux, Android or similar. The computer system can include a main memory, preferably random access memory (RAM), and may also include a non-transitory hard disk drive and/or a removable non-transitory memory, and/or a non-transitory solid state memory. Non-transitory removable memory can be an optical disk such as a compact disc (CD-ROM or DVD-ROM), a magnetic tape, which is read by and written to by a suitable reader. The removable non-transitory memory can be a computer readable medium having stored therein computer software and/or data. The non-volatile storage memory can be used to store persistent information that should not be lost if the computer system is powered down. The application programs may use and store information in the non-volatile memory.

The software embodied in the computer program product is adapted to carry out the following functions when the software is loaded onto the respective device or devices and executed on one or more processing engines such as microprocessors, ASIC's, FPGA's etc.:
configuring network devices for streaming electronic media data over a computer network comprising a web server, a non-volatile memory and at least two type 1 network devices and at least one type 2 network device connected to the web server over the computer network.

The software embodied in the computer program product is adapted to carry out the following functions when the software is loaded onto the respective device or devices and executed on one or more processing engines such as microprocessors, ASIC's, FPGA's etc.:
the web server creating or receiving an electronic list of all network devices connected to said web server, each network device having an entry in the electronic list which entry is stored by the web server in said electronic list in the non-volatile memory.

The software embodied in the computer program product is adapted to carry out the following functions when the software is loaded onto the respective device or devices and executed on one or more processing engines such as microprocessors, ASIC's, FPGA's etc.:
configuring use-cases comprising:
for at least two use-cases, for each use-case
adding an electronic use-case label to entries of at least two type 1 network devices and
at least one type 2 network device in the electronic list,
for each network device having the electronic use-case label, the web server storing in the non-volatile memory
for each network device of a first type, a first list of electronic device labels,
for each network device of a second type, the web server storing a second list of electronic device labels defining at least one condition wherein for each condition at least one out of a subset of the second list of electronic device labels is present or is not present in the first list of electronic device labels.

Alternatively or optionally, a Boolean logic expression can be stored comprising at least one Boolean operator out of "AND", "OR", "NOT", and at least one Boolean operand, wherein for each Boolean operand there is a dedicated item in said second list of electronic device labels.

The software embodied in the computer program product is adapted to carry out the following functions when the software is loaded onto the respective device or devices and executed on one or more processing engines such as microprocessors, ASIC's, FPGA's etc.:
activating a use-case comprising: the web server receiving a notification of a use-case selected by a user via inputs from a web page served by said web server,
for each network device having the selected electronic use-case label, automatically providing the web server with write access to the non-volatile memory,
for each pair of a type 1 network device and a type 2 network device, the web server reading the first and second lists of electronic device labels and the at least one condition if all conditions defined for the active use-case are fulfilled, whereby the web server instructs the network devices for streaming electronic media data from the type 1 network device to the type 2 network device.

Alternatively or optionally, the Boolean logic expression can be read, for each operand of the Boolean logic expression.

The software embodied in the computer program product is adapted to carry out the following functions when the software is loaded onto the respective device or devices and executed on one or more processing engines such as microprocessors, ASIC's, FPGA's etc.:
optionally or alternatively, if the dedicated item in the second list of electronic device labels is present in the first list of electronic device labels, the web server sets the operand to TRUE, otherwise it sets the operand to FALSE, then, optionally or alternatively, the web server evaluates the Boolean logic expression and if the Boolean logic expression yields TRUE the web server instructs the network devices for streaming electronic media data from the type 1 network device to the type 2 network device.

The software embodied in the computer program product is adapted to carry out the following functions when the software is loaded onto the respective device or devices and executed on one or more processing engines such as microprocessors, ASIC's, FPGA's etc.:

for a selected use-case, while streaming electronic media data over the computer network, adding a network device to the network.

for the added network device the web server adding an entry in the electronic list of network devices, and adding an electronic use-case label to said entry.

The software embodied in the computer program product is adapted to carry out the following functions when the software is loaded onto the respective device or devices and executed on one or more processing engines such as microprocessors, ASIC's, FPGA's etc.:

if the added network device is of the first type, then the web server stores in the non-volatile memory, a first list of electronic device label.

if the added network device is of the second type, then the web server stores in the non-volatile memory, a second list of electronic device labels defining at least one condition wherein for each condition at least one out of a subset of the second list of electronic device labels is present or is not present in the first list of electronic device labels.

Optionally or alternatively, a Boolean logic expression can be stored comprising at least one Boolean operator out of "AND", "OR", "NOT", and at least one Boolean operand, wherein for each Boolean operand there is a dedicated item in said second list of electronic device labels.

The software embodied in the computer program product is adapted to carry out the following functions when the software is loaded onto the respective device or devices and executed on one or more processing engines such as microprocessors, ASIC's, FPGA's etc.:

for the added network device having the selected electronic use-case label, automatically providing the web server with write access to the non-volatile memory.

for each pair of the added network device and a network device of a device type other than the added network device, having the use-case label of the selected use-case, the web server reading the first and second lists of electronic device labels and the at least one condition if all conditions defined for the active use-case are fulfilled, whereby the web server instructs the network devices for streaming electronic media data from the type 1 network device to the type 2 network device.

Optionally or alternatively, the web server can read the Boolean logic expression, and for each operand of the Boolean logic expression, if the dedicated item in the second list of electronic device labels is present in the first list of electronic device labels, the web server sets the operand to TRUE, otherwise it sets the operand to FALSE.

Optionally or alternatively, the web server can evaluate the Boolean logic expression and if the Boolean logic expression yields TRUE the web server instructs the network devices for streaming electronic media data from the type 1 network device to the type 2 network device.

The software embodied in the computer program product is adapted to carry out the following functions when the software is loaded onto the respective device or devices and executed on one or more processing engines such as microprocessors, ASIC's, FPGA's etc.:

the set of electronic device labels of the network device depends on the credentials or certificates used for connecting the network device to the web server.

instructing at least one type 2 network device that is receiving at least one electronic media data stream to start rendering the at least one electronic media data stream.

instructing at least one type 2 network device that is receiving at least one electronic media data stream, to not render at least one of the at least one received electronic media data stream.

The software embodied in the computer program product is adapted to carry out the following functions when the software is loaded onto the respective device or devices and executed on one or more processing engines such as microprocessors, ASIC's, FPGA's etc.:

the step of activating a use-case comprises the notification having a use-case selected by a user and at least one device label.

executing the step of activating the selected use-case for all network devices having the use-case label and at least one of the at least one device label.

The software embodied in the computer program product is adapted to carry out the following functions when the software is loaded onto the respective device or devices and executed on one or more processing engines such as microprocessors, ASIC's, FPGA's etc.:

while a first use-case is active, the web server receiving a notification comprising a second use-case selected by a user and at least one second device label being different from any of the at least one device label of the first use-case.

The web server executing the step of activating the selected second use-case for all network devices having the second use-case label and at least one of the at least one second device label.

The software embodied in the computer program product is adapted to carry out the following functions when the software is loaded onto the respective device or devices and executed on one or more processing engines such as microprocessors, ASIC's, FPGA's etc.:

activating a use-case comprises the notification having at least one first device label and at least one second device label and at least one third device label.

executing the step of activating the selected use-case comprising adding the at least one third device label to the device label list of all network devices having the use-case label and at least one of the at least one first device label and at least one of the at least one second device label.

Any of the above software may be implemented as a computer program product which has been compiled for a processing engine in any of the servers or nodes of the network or is written in an interpretive language such as Java that runs on a virtual machine such as the Java virtual machine. The computer program product may be stored on a non-transitory signal storage medium such as an optical disk (CD-ROM or DVD-ROM), a digital magnetic tape, a magnetic disk, a solid state memory such as a USB flash memory, a ROM, etc.

The invention claimed is:

1. A method for configuring network devices for streaming electronic media data over a computer network comprising a web server, a non-volatile memory and at least two type 1 network devices and at least one type 2 network device connected to the web server over the computer network, a type 1 network device is a source and a source has a source role that qualifies the function of the source in a use case, a type 2 network device is a sink which is a network device in the network that can receive at least one stream from a source in the network and render the at least one received stream into a form suitable for an end-user, whereby sink role indicates the function of the sink in a use case, a network device is a network enabled digital processing device having some form of output medium, the method comprising the steps of:

the web server creating or receiving an electronic list of all network devices connected to said web server, each network device having an entry in the electronic list which entry is stored by the web server in said electronic list in the non-volatile memory, and configuring use-cases comprising:

for at least two use-cases, for each use-case adding an electronic use-case label to entries of at least two type 1 network devices and at least one type 2 network device in the electronic list, for each network device having the electronic use-case label, the web server storing in the non-volatile memory, for each network device of a first type, a first list of electronic device labels, for each network device of a second type, the web server storing a second list of electronic device labels defining at least one condition, wherein for each condition at least one out of a subset of the second list of electronic device labels is present or is not present in the first list of electronic device labels, the step of activating a use-case comprising:

the web server receiving a notification of a use-case selected by a user via inputs from a web page served by said web server, for each network device having the selected electronic use-case label, automatically providing the web server with write access to the non-volatile memory, for each pair of a type 1 network device and a type 2 network device, the web server reading the first and second lists of electronic device labels and the at least one condition and for all pairs where all conditions defined for the active use-case are fulfilled, the web server is configured to instruct the network devices for streaming electronic media data from a type 1 network device to all of the type 2 network devices.

2. The method according to claim 1, comprising, for a selected use-case, while streaming electronic media data over the computer network, adding a network device to the network, for the added network device, the web server adding an entry in the electronic list of network devices, and adding an electronic use-case label to said entry, wherein if the added network device is of the first type, then the web server storing in the non-volatile memory, a first list of electronic device labels, if the added network device is of the second type, then the web server storing in the non-volatile memory, a second list of electronic device labels defining at least one condition wherein for each condition at least one out of a subset of the second list of electronic device labels is present or is not present in the first list of electronic device labels, for the added network device having the selected electronic use-case label, automatically providing the web server with at least write access to the non-volatile memory, for each pair of the added network device and a network device of a device type other than the added network device, having the use-case label of the selected use-case, the web server reading the first and second lists of electronic device labels and the at least one condition and if all conditions defined for the active use-case are fulfilled, the web server being configured to instruct the network devices for streaming electronic media data from the type 1 network device to all the type 2 network devices.

3. The method according to claim 1, wherein the set of electronic device labels of the network device depends on the credentials or certificates used for connecting the network device to the web server.

4. The method according to claim 1, comprising, for a selected use-case, while streaming electronic media data over the computer network, adding a network device to the network, for the added network device, the web server adding an entry in the electronic list of network devices, and adding an electronic use-case label to said entry, if the added network device is of the first type, then the web server storing in the non-volatile memory, a first list of electronic device labels, if the added network device is of the second type, then the web server storing in the non-volatile memory, a second list of electronic device labels defining at least one condition wherein for each condition at least one out of a subset of the second list of electronic device labels is present or is not present in the first list of electronic device labels, for the added network device having the selected electronic use-case label, automatically providing the web server with at least write access to the non-volatile memory, for each pair of the added network device and a network device of a device type other than the added network device, having the use-case label of the selected use-case, the web server reading the first and second lists of electronic device labels and the at least one condition and if all conditions defined for the active use-case are fulfilled, the web server being configured to instruct the network devices for streaming electronic media data from the type 1 network device to all the type 2 network devices, and wherein the set of electronic device labels of the network device depends on the credentials or certificates used for connecting the network device to the web server.

5. The method according to claim 1, comprising instructing at least one type 2 network device that is receiving at least one electronic media data stream to start rendering the at least one electronic media data stream, and/or instructing at least one type 2 network device that is receiving at least one electronic media data stream, to not render at least one of the at least one received electronic media data stream, and/or instructing at least one type 2 network device that is receiving at least one electronic media data stream to start rendering the at least one electronic media data stream in accordance with a set of rules.

6. The method according to claim 1, comprising, for a selected use-case, while streaming electronic media data over the computer network, adding a network device to the network, for the added network device, the web server adding an entry in the electronic list of network devices, and adding an electronic use-case label to said entry, if the added network device is of the first type, then the web server storing in the non-volatile memory, a first list of electronic device labels, if the added network device is of the second type, then the web server storing in the non-volatile memory, a second list of electronic device labels defining at least one condition wherein for each condition at least one out of a subset of the second list of electronic device labels is present or is not present in the first list of electronic device labels, for the added network device having the selected electronic use-case label, automatically providing the web server with at least write access to the non-volatile memory, for each pair of the added network device and a network device of a device type other than the added network device, having the use-case label of the selected use-case, the web server reading the first and second lists of electronic device labels and the at least one condition and if all conditions defined for the active use-case are fulfilled, the web server being configured to instruct the network devices for streaming electronic media data from the type 1 network device to all the type 2 network devices;

further comprising instructing at least one type 2 network device that is receiving at least one electronic media data stream to start rendering the at least one electronic media data stream, and/or instructing at least one type 2 network device that is receiving at least one electronic media data stream, to not render at least one of the at least one received electronic media data stream, and/or instructing at least one type 2 network device that is receiving at least one electronic media data stream to start rendering the at least one electronic media data stream in accordance with a set of rules.

7. The method according to claim 1, wherein the set of electronic device labels of the network device depends on the credentials or certificates used for connecting the network device to the web server; and comprising instructing at least one type 2 network device that is receiving at least one electronic media data stream to start rendering the at least one electronic media data stream, and/or instructing at least one type 2 network device that is receiving at least one electronic media data stream, to not render at least one of the at least one received electronic media data stream, and/or instructing at least one type 2 network device that is receiving at least one electronic media data stream to start rendering the at least one electronic media data stream in accordance with a set of rules.

8. The method according to claim 1, comprising, for a selected use-case, while streaming electronic media data over the computer network, adding a network device to the network, for the added network device, the web server adding an entry in the electronic list of network devices, and adding an electronic use-case label to said entry, if the added network device is of the first type, then the web server storing in the non-volatile memory, a first list of electronic device labels, if the added network device is of the second type, then the web server storing in the non-volatile memory, a second list of electronic device labels defining at least one condition wherein for each condition at least one out of a subset of the second list of electronic device labels is present or is not present in the first list of electronic device labels, for the added network device having the selected electronic use-case label, automatically providing the web server with at least write access to the non-volatile memory, for each pair of the added network device and a network device of a device type other than the added network device, having the use-case label of the selected use-case, the web server reading the first and second lists of electronic device labels and the at least one condition and if all conditions defined for the active use-case are fulfilled, the web server being configured to instruct the network devices for streaming electronic media data from the type 1 network device to all the type 2 network devices; and wherein the set of electronic device labels of the network device depends on the credentials or certificates used for connecting the network device to the web server; and comprising instructing at least one type 2 network device that is receiving at least one electronic media data stream to start rendering the at least one electronic media data stream, and/or instructing at least one type 2 network device that is receiving at least one electronic media data stream, to not render at least one of the at least one received electronic media data stream, and/or instructing at least one type 2 network device that is receiving at least one electronic media data stream to start rendering the at least one electronic media data stream in accordance with a set of rules.

9. The method according to claim 1, wherein the step of activating a use-case comprises the notification having a use-case selected by a user and at least one device label, and executing the step of activating the selected use-case, for all network devices having the use-case label and at least one of the at least one device label and/or wherein the step of activating a use-case comprises the notification having at least one first device label and at least one second device label and at least one third device label, and executing the step of activating the selected use-case comprises adding the at least one third device label to the device label list of all network devices having the use-case label and at least one of the at least one first device label and at least one of the at least one second device label.

10. The method according to claim 9, comprising while a first use-case is active, the web server receiving a notification comprising a second use-case selected by a user and at least one second device label being different from any of the at least one device label of the first use-case, and executing the step of activating the selected second use-case for all network devices having the second use-case label and at least one of the at least one second device label.

11. A system for exchanging electronic media data over a computer network comprising:

a web server, a non-volatile memory, and at least two type 1 network devices and at least one type 2 network device connected to the web server over the computer network, wherein a type 1 network device is a source and a source has a source role that qualifies the function of the source in a use case, a type 2 network device is a sink which is a network device in the network that can receive at least one stream from a source in the network and render the at least one received stream into a form suitable for an end-user, wherein a sink role indicates the function of the sink in a use case, a network device is a network enabled digital processing device having some form of output medium, an electronic list of all network devices connected to said web server, each network device having an entry in the electronic list, the web server being configured to store the entry in said list in the non-volatile memory, for at least two use-cases, for each use-case, the entries of at least two type 1 network device and at least one type 2 network device in the electronic list have an electronic use-case label, wherein for each network device having the electronic use-case label, the non-volatile memory stores, for each network device of a first type, a first list of electronic device labels, for each network device of a second type, a second list of electronic device labels defining at least one condition wherein for each condition at least one out of a subset of the second list of electronic device labels is present or is not present in the first list of electronic device labels, further comprising:

means for activating a use-case which comprises the web server being configured to receive a notification of a use-case selected by a user via inputs from a web page served by said web server, for each network device having the selected electronic use-case label the web server being configured to automatically receive write access to the non-volatile memory, for each pair of a type 1 network device and a type 2 network device, the web server being configured to read the first and second lists of electronic device labels and the at least one condition and for all pairs where all conditions defined for the active use-case are fulfilled, the web server is configured to instruct the network devices for streaming electronic media data from a type 1 network device to all of the type 2 network devices.

12. The system according to claim 11, wherein the web server is configured to be deployed in the cloud or on-premises.

13. The system according to claim 11, comprising, for a selected use-case, while streaming electronic media data over the computer network, means for adding a network device to the network, and for the added network device, the web server is configured to add an entry in the electronic list of network devices, and to add an electronic use-case label to said entry, wherein if the added network device is of the first type, the web server is configured to store in the non-volatile memory, a first list of electronic device labels, and if the added network device is of the second type, the web server is configured to store in the non-volatile memory, a second list of electronic device labels and a Boolean logic expression comprising at least one Boolean operator out of "AND", "OR", "NOT", and at least one Boolean operand, wherein for each Boolean operand there is a dedicated item in said second list of electronic device labels, for the added network device having the selected electronic use-case label, the web server being configured to automatically obtain write access to the non-volatile memory, for each pair of the added network devices and a network device of a device type other than the added network device, having the use-case label of the selected use-case, the web server is configured to read the first and second lists of electronic device labels and the Boolean logic expression, and for each operand of the Boolean logic expression, if the dedicated item in the second list of electronic device labels is present in the first list of electronic device labels, the web server is configured to set the operand to a first value of a pair (TRUE), otherwise it sets the operand to the second value of the pair (FALSE), the web server being configured to evaluate the Boolean logic expression and if the Boolean logic expression yields a first value of a pair (TRUE), the web server is configured to instruct the network devices for streaming electronic media data from the type 1 network device to the type 2 network device.

14. The system according to claim 11, wherein the web server is configured to be deployed in the cloud or on-premises; and comprising, for a selected use-case, while streaming electronic media data over the computer network, means for adding a network device to the network, and for the added network device, the web server is configured to add an entry in the electronic list of network devices, and to add an electronic use-case label to said entry, if the added network device is of the first type, the web server is configured to store in the non-volatile memory, a first list of electronic device labels, and if the added network device is of the second type, the web server is configured to store in the non-volatile memory, a second list of electronic device labels and a Boolean logic expression comprising at least one Boolean operator out of "AND", "OR", "NOT", and at least one Boolean operand, wherein for each Boolean operand there is a dedicated item in said second list of electronic device labels, for the added network device having the selected electronic use-case label, the web server being configured to automatically obtain write access to the non-volatile memory, for each pair of the added network devices and a network device of a device type other than the added network device, having the use-case label of the selected use-case, the web server is configured to read the first and second lists of electronic device labels and the Boolean logic expression, and for each operand of the Boolean logic expression, if the dedicated item in the second list of electronic device labels is present in the first list of electronic device labels, the web server is configured to set the operand to a first value of a pair (TRUE), otherwise it sets the operand to the second value of the pair (FALSE), the web server being configured to evaluate the Boolean logic expression and if the Boolean logic expression yields a first value of a pair (TRUE), the web server is configured to instruct the network devices for streaming electronic media data from the type 1 network device to the type 2 network device.

15. The system according to claim 11, wherein the set of electronic device labels of the network device depends on the credentials or certificates used for connecting the network device to the web server.

16. The system according to claim 11, comprising at least one type 2 network device that is receiving at least one electronic media data stream being configured to receive an instruction to start rendering the at least one electronic media data stream and/or comprising at least one type 2 network device that is receiving at least one electronic media data stream, being configured to receive an instruction to not render at least one of the at least one received electronic media data stream, and/or any content rendered by each of the type 2 devices having the selected electronic use-case label is received directly from the type 1 device that renders the electronic media data containing said content without any intermediate type 1 or type 2 network device processing said content.

17. The system according to claim 11, wherein the means for activating a use-case comprises the notification having a use-case selected by a user and at least one device label, and being configured to execute activating of the selected use-case for all network devices having the use-case label and at least one of the at least one device label, and/or wherein the means for activating a use-case comprises the notification having at least one first device label and at least one second device label and at least one third device label, and being configured to execute activating of the selected use-case by adding the at least one third device label to the device label list of all network devices having the use-case label and at least one of the at least one first device label and at least one of the at least one second device label.

18. The system according to claim 17, comprising while a first use-case is active, the web server is configured to receive a notification comprising a second use-case selected by a user and at least one second device label being different from any of the at least one device label of the first use-case, and is also configured to execute activating of the selected second use-case for all network devices having the second use-case label and at least one of the at least one second device label.

19. A non-transitory computer program product which, when executed on a processing engine, causes the processing engine to carry out a method according to claim 1.

* * * * *